(No Model.) 2 Sheets—Sheet 1.

N. REUTER.
FEEDING AND WATERING DEVICE.

No. 587,329. Patented Aug. 3, 1897.

WITNESSES

INVENTOR
Nickolas Reuter:
By John Weatherbern
Attorney (No Model.)  2 Sheets—Sheet 2.
N. REUTER.
FEEDING AND WATERING DEVICE.
No. 587,329. Patented Aug. 3, 1897.
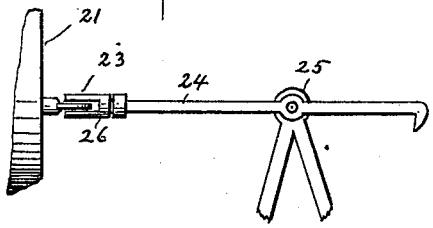
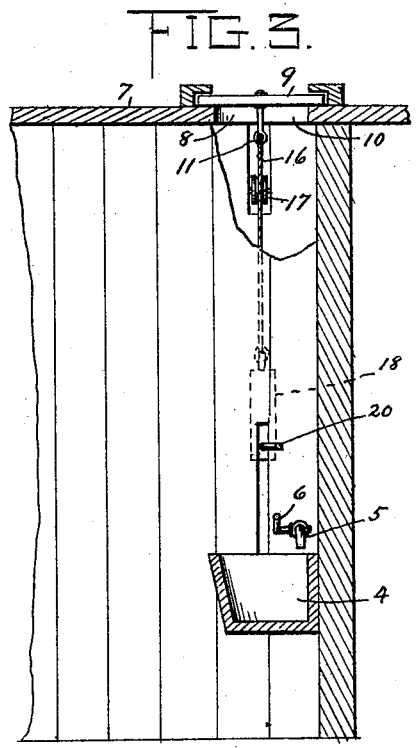
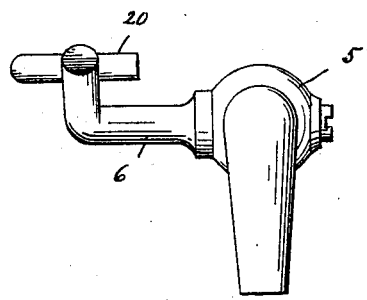
WITNESSES
INVENTOR
Nickolas Reuter
By John Wedderburn
Attorney

UNITED STATES PATENT OFFICE.

NICKOLAS REUTER, OF CHICAGO, ILLINOIS.

FEEDING AND WATERING DEVICE.

SPECIFICATION forming part of Letters Patent No. 587,329, dated August 3, 1897.

Application filed February 20, 1897. Serial No. 624,344. (No model.)

*To all whom it may concern:*

Be it known that I, NICKOLAS REUTER, a citizen of the United States, residing at Chicago, in the county of Cook and State of Illinois, have invented certain new and useful Improvements in Automatic Live-Stock Feeding and Watering Devices; and I do hereby declare the following to be a full, clear, and exact description of the invention, such as will enable others skilled in the art to which it appertains to make and use the same.

My invention relates to improvements in automatic stock feeding and watering devices, and has for its object the production of a simple, durable, and efficient apparatus which will be controlled by timing mechanism to deposit food and water in the manger at a proper time without attention from the operator and which when so actuated will sound an alarm apprising the stock of the arrival of feeding-time.

To the accomplishment of these and other objects my invention consists in providing trap-doors above the manger over which are deposited the feed and water receptacle properly located, the trap or feed doors and the flow of water from the water-receptacle being controlled by cables which are wound around a drum the movement of which is controlled by tripping mechanism designed to be actuated by timing mechanism.

Figure 1:
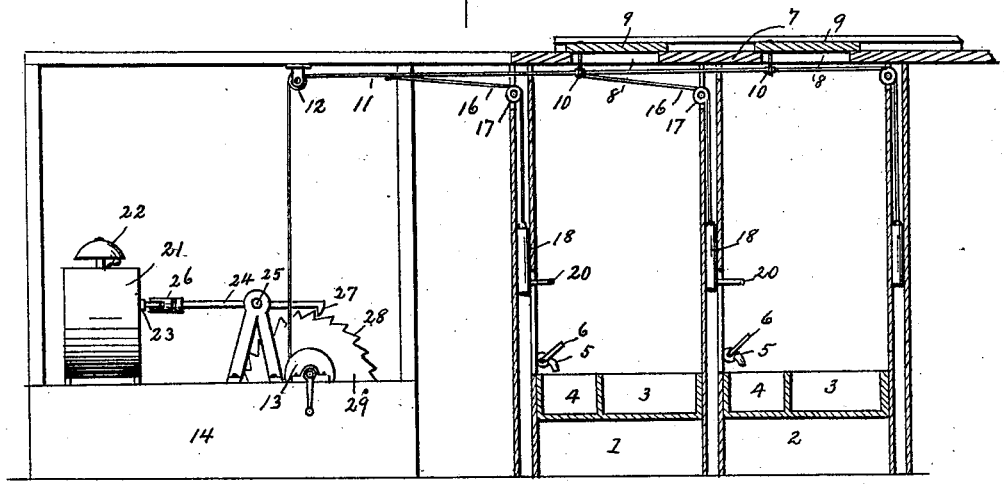
Figure 2:
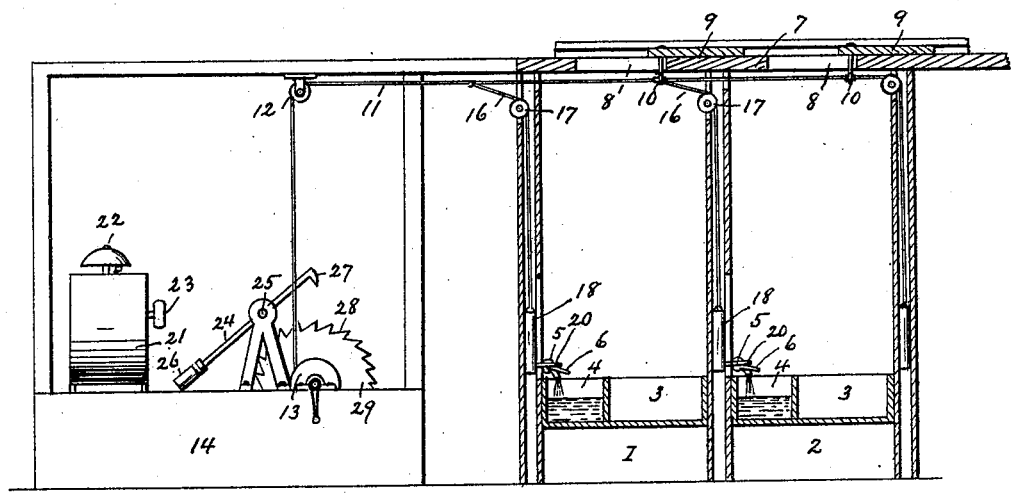

Referring to the drawings, Figure 1 is a general view illustrating the application of my device, showing the trap-doors closed. Fig. 2 is a similar view showing the tripping-lever tripped and the feed-doors open. Fig. 3 is a front elevation, on an enlarged scale, of the mechanism designed to control the movement of the feed-doors and the cocks of the water-receptacle. Fig. 4 is a detail view of the connection between the tripping-lever and the timing mechanism, and Fig. 5 is a detail view of one of the water-cocks and its actuating-lever.

Referring to the numerals on the drawings, 1 and 2 indicate a pair of stalls provided with mangers 3, a water-receptacle 4, provided with cocks 5, controlled by valve-levers 6, designed to be actuated in a manner to be made apparent.

7 indicates the floor of the loft, in which are located feed-apertures 8, immediately above which are designed to slide trap or feed doors 9, having depending brackets or arms 10, to which is secured a cable 11, passing around the pulley 12 and having its extremity wound around a drum 13, suitably journaled in a casing 14, a crank or other suitable means being provided for the purpose of rotating the drum to wind the cable upon it.

16 16 indicate weight-cords secured to the cable 11, passed around pulleys 17, located in the stall-partitions and carrying at their extremities counterbalancing-weights 18, sliding in suitable ways.

It will be apparent that when the cable 11 is wound upon the drum 13 the trap-doors will be retained in a closed position, as indicated in Fig. 1 of the drawings, and by reason of the counterweights 18 being suspended on the cords 16 the said cords will slide the feed-doors 9 to the open position.

I shall now proceed to describe the tripping mechanism by means of which the drum 13 is retained in its proper position until the predetermined time has arrived, at which time by means of my invention the drum is released and the feed-doors are thrown open by the counterbalance-weights, which are provided with projecting lugs 20, designed, when the weights are tripped, to operate the valve-levers 6 of the cocks 5 and cause the water within the receptacle 4 to be discharged into the manger.

21 indicates an ordinary alarm-clock provided with timing mechanism and alarm mechanism 22, capable of being set in a manner well understood in the art to sound at a predetermined time. The alarm mechanism is ordinarily wound by means of a key 23, which when the alarm is sounded rotates with the pinion of the alarm-shaft. In order, therefore, to utilize these well-known contrivances as timing mechanism for my apparatus, I provide what I will term the "tripping-lever" 24, fulcrumed at 25 and provided at its rear extremity with a slotted sleeve 26, designed to receive the key 23 of the alarm mechanism. The rotation of the key will consequently cause a depression of the tripping-lever and a corresponding elevation of its front end, which is provided with a dog 27, designed to engage ratchet-teeth 28 upon a ratchet-wheel 29, keyed or otherwise secured upon the shaft of the drum 13.

The operation of my apparatus organized as described is as follows: The drum is rotated by means of the crank 15 to wind the cable 11 and thereby close the feed-doors and lift the counterbalance-weights and is retained in a wound position by the engagement of the dog 27 with the ratchet-wheel 29. The alarm of the timing mechanism is now set to operate at feeding-time, and the key 23 is inserted in the slot of the sleeve 26, when the alarm is sounded in the manner well understood in the art, and therefore not explained in detail. The rotation of the key 23 will cause the disengagement of the tripping-lever from the ratchet-wheel. The counterbalance-weights 18 will then draw open the feed-doors to permit the feed to drop to the mangers, and the projections 20 will actuate the valve-levers 6 to supply water to the manger or to a tank especially provided.

It will be observed from the foregoing that I have produced an apparatus which will cause stock to be fed automatically at the proper time and which will sound an alarm as the fodder is thrown into the manger.

While the construction and arrangement of elements specified is believed to constitute the preferable embodiment of my invention, I do not desire to limit myself to the details of construction herein shown and described, but reserve the right to change, modify, or vary such details within the scope of my invention.

Having thus described my invention, what I claim as new, and desire to secure by Letters Patent, is—

1. In a device of the character described, the combination with a manger or suitable receptacle, of a counterweighted feed-door, automatic tripping mechanism connected therewith, a water-receptacle provided with a controlling-cock, and coöperative mechanism carried by the cock and counterweight, substantially as specified.

2. In combination with feed and water receptacles, of a feed-door, a cock designed to control the water-supply, a counterweight connected with the feed-door and designed to open or close the cock, tripping mechanism operatively connected with the feed-door, and timing mechanism designed to permit the tripping of the tripping mechanism, substantially as specified.

3. In a device of the character described, the combination with feed and water receptacles, of sliding feed-doors, a cock designed to control the water-supply and provided with a valve-lever, a counterweight connected with the feed-door, and provided with a projecting lug designed to actuate the valve-lever, a flexible piece connected with the feed-door, a drum designed to receive said piece, tripping mechanism operatively connected with the drum, and timing mechanism operatively connected with the tripping mechanism, substantially as specified.

4. In a device of the character described, the combination with feed and water receptacles, of a feed-door and cock provided with a valve-lever, a counterweight connected with a door and provided with a projecting lug designed to actuate the valve-lever and drum, a tripping-lever designed to control the movement of said drum and provided with a slotted sleeve, a timepiece and a rotatable key designed to be actuated by the timepiece and to engage the slot in said sleeve, and a flexible piece wound around the drum and connected to the feed-door, substantially as specified.

In testimony whereof I have signed this specification in the presence of two subscribing witnesses.

NICKOLAS REUTER.

Witnesses:
M. J. METZGER,
J. J. J. OVERMYER.